United States Patent [19]

Noda et al.

[11] 4,382,964

[45] May 10, 1983

[54] PROCESS FOR PRODUCING SOY SAUCE OR MISO

[75] Inventors: Fumio Noda, Kamagaya; Akio Hagiwara, Showamachi; Kazuya Hayashi, Kashiwa; Takashi Iwaasa, Noda; Takeji Mizunuma, Noda; Toshio Sakasai, Noda, all of Japan

[73] Assignee: Kikkoman Corporation, Noda, Japan

[21] Appl. No.: 197,671

[22] Filed: Oct. 15, 1980

[30] Foreign Application Priority Data

Oct. 20, 1979 [JP] Japan ................................ 54-134739

[51] Int. Cl.³ .......................... A23L 1/20; A23L 1/238
[52] U.S. Cl. ............................................. 426/7; 426/18; 426/44; 426/46; 426/48; 426/49; 426/589; 426/650
[58] Field of Search ....................... 426/18, 44, 46, 48, 426/49, 52, 60, 589, 638, 648, 650, 7, 9, 11, 592

[56] References Cited

U.S. PATENT DOCUMENTS

| | | | |
|---|---|---|---|
| 3,495,991 | 2/1970 | Mogi et al. | 426/46 |
| 3,711,303 | 6/1973 | Luksas | 426/46 |
| 4,115,591 | 9/1978 | Noda et al. | 426/18 |
| 4,117,169 | 9/1978 | Noda et al. | 426/7 |

FOREIGN PATENT DOCUMENTS

| | | | |
|---|---|---|---|
| 2388507 | 12/1978 | France | 426/7 |
| 38-6582 | 4/1963 | Japan. | |
| 46-24080 | 6/1971 | Japan. | |

Primary Examiner—Raymond N. Jones
Assistant Examiner—Elizabeth A. Hatcher
Attorney, Agent, or Firm—Schuyler, Banner, Birch, McKie & Beckett

[57] ABSTRACT

An improved process for producing a salty seasoning by fermentation, wherein the improvement is characterized in that the feeding of raw materials, fermentation or ripening is carried out in the co-presence of potassium chloride and sodium chloride.

As compared with the product obtained by a conventional process, the salty seasoning obtained by the above process has a better flavor and has a much lower sodium chloride content so that it is suitable for use in a low sodium diet.

7 Claims, No Drawings

PROCESS FOR PRODUCING SOY SAUCE OR MISO

This invention relates to a process for producing salty seasoning.

Among salty seasonings, soy sauce and Miso (soy paste) are traditional foods characteristic of the Orient and are recently being popularized all over the world as their agreeable flavor and taste are increasingly appreciated.

The soy sauce and Miso have heretofore been produced by first preparing Koji by growing and prolifying Aspergillus molds on cereals such as soybean, defatted soybean, wheat and rice which have been undergone heat treatments such as denaturation cooking and pasteurization, then charging an aqueous common salt solution and the Koji alone or in admixture with cereals, which have been subjected to heat treatments such as denaturation cooking and pasteurization, into a fermenter, and subjecting the charged mixture to fermentation and ripening.

The fermentation and ripening are carried out always in the presence of about 10 to 20% of common salt, because otherwise the soy Moromi (fermentation mixture to make soy sauce) or the Miso will putrefy before the final product is obtained.

However, although advantageous for the antisepsis, the presence of salt in such a high concentration will interfere with the growth and proliferation of halotolerant lactic acid bacteria and halotolerant yeasts both participating in the fermentation and ripening, thereby affecting adversely the brewing of mellow flavor and, in addition, inhibiting the enzymes produced by the Aspergillus molds, resulting in insufficient decomposition and dissolution of useful constituents of the raw materials.

On the other hand, if the salt concentration in soy Moromi or Miso is comparatively low, the fermentation and ripening are difficult to proceed in normal ways owing to the growth and proliferation of injurious putrefactive bacteria.

Another defect of those salty seasonings such as soy sauce and Miso which contain large amounts of sodium chloride as described above is their unsuitableness for those patients suffering from cardiac diseases, vascular diseases, and nephritis who are put on a low sodium diet. To overcome the above difficulties, a number of processes for the manufacture of salty seasonings have been proposed. For instance, Japanese Patent Publication No. 6,582/63 has disclosed a process for producing soy sauce restricted in sodium content, which comprises preparing soy Koji in a customary manner using a protein source such as defatted soybean and a starch source such as wheat, ripening the soy Koji in an aqueous potassium chloride solution of suitable concentration with frequent stirring, removing the insolubles from the resulting Moromi by means of a press to obtain a soy sauce containing potassium chloride and no sodium chloride, mixing said soy sauce with a customary soy sauce in an appropriate ratio so that the molar ratio of potassium to sodium may be adjusted to 1:1, then subjecting the mixed soy sauce to customary processing such as pasteurization, clarification, and so on.

Japanese Patent Application Laid-open No. 82,094/73 (U.S. Pat. No. 3,711,303) has disclosed a process for producing soy sauce having a natural soy sauce flavor and a good taste in a relatively short time, which comprises, in a "Koji and Moromi" process for producing soy sauce, inoculating the Moromi with microorganisms isolated from Moromi and a yeast selected from the group consisting of Saccharomyces, Debaryomyces, and mixtures thereof, fermenting the inoculated Moromi for at least about 3 days, and separating the fermentation liquor from the Moromi; said salt being preferably sodium chloride or potassium chloride.

Further, Japanese Patent Publication No. 24,080/71 proposed a process for producing a powdered low salt Miso for medical treatment, which comprises keeping a mixture of cooked soybean and rice Koji at a temperature of 45° to 60° C. for 12 to 48 hours in the absence of common salt to effect the digestive decomposition of a part of said mixture with enzymes produced by Aspergillus molds, then maintaining the resulting mixture at a temperature of 25° C. or below for 10 days or less to ripen the flavor, drying and pulverizing the mixture, mixing uniformly with a dried and powdered fermentation Miso in any desired ratio, and to reduce the common salt content of the fermentation Miso, followed by an optional step of mixing uniformly with a common salt substitutive saline substance such as potassium malate or potassium chloride.

The present inventors carried out extensive studies to eliminate the aforementioned defects and, as a result, found that in producing a salty seasoning by fermentation, when the feed mixture is prepared or the fermentation or ripening is carried out in the presence of both potassium chloride and sodium chloride, it is possible to effect satisfactory decomposition and leaching-out of useful constituents of the fermentation raw materials and to develop mellow flavor, while maintaining the total concentration of potassium chloride and sodium chloride at the level of sodium chloride concentration in a conventional process. Based on this finding, the present invention has been accomplished.

An object of this invention is to provide a process for producing a salty seasoning having a mellow flavor and of low sodium chloride content.

Another object of this invention is to provide a process for producing a salty seasoning, which favors the decomposition and leaching-out of useful constituents of raw materials.

Other objects and advantages of this invention will become apparent from the following description.

According to this invention, there is provided an improved process for producing a salty seasoning by fermentation, wherein the improvement is characterized in that the feeding of raw materials, fermentation or ripening is carried out in the co-presence of potassium chloride and sodium chloride.

The invention is more fully described below.

Examples of salty seasonings, as herein referred to, include soy sauces manufactured by customary soy sauce brewing processes such as deep-colored soy sauce, light-colored soy sauce, white soy sauce, Tamari soy sauce, and new-type No. 2 soy sauce (semi-chemical and semi-fermentation soy sauce); soy-sauce-like liquid seasonings prepared by the hydrolysis of starch materials and protein materials with an enzyme preparation or an acid, followed by fermentation and ripening; and Miso products manufactured by customary Miso brewing processes such as white Miso, Edo Miso, Sendai Miso, Shinshu Miso, wheat Miso, and soy Miso.

The raw materials for the seasonings to be used in the present process include a wide variety of materials.

Examples are protein materials such as soybean, defatted soybean, mixtures thereof, gluten and fish meal and starch materials such as wheat, barley, rice, and wheat bran.

The protein-denaturation or starch-gelatinization (conversion into α-form) of the above-listed raw materials for the salty seasonings may be carried out by cooking denaturation treatment, aqueous ethanol denaturation treatment, and thermal expansion denaturation treatment with saturated or superheated steam. Parching treatment is carried out for the starch-gelatinization in addition to the above-mentioned treatment. The treating method may be suitably selected.

The raw materials for the salty seasonings, which have been subjected to protein-denaturation or starch-gelatinization as described above, are further processed as such or converted into Koji in a usual manner. In the process of this invention, both potassium chloride and sodium chloride are present when the raw materials for salty seasoning, which have been subjected to protein-denaturation or starch-gelatinization, are hydrolyzed by the addition of enzymes such as protease, peptidase, amylase and pectinase or by the addition of an acid such as hydrochloric acid or when the Koji prepared from said raw materials is charged together with other components in making up a feed mixture; or, alternatively, Moromi, Moromi-like mixture or Miso formed from the feed mixture is allowed to ferment or ripen in the presence of both potassium chloride and sodium chloride. The charging of raw materials, fermentation, and ripening may be carried out in the usual manner, except for the presence of both potassium chloride and sodium chloride.

The total concentration of potassium chloride and sodium chloride should be in the range of 7 to 20% (W/V) which is similar to the concentration range of sodium chloride in a conventional process. A preferable total salt concentration is in the range of 15 to 20% (W/V) for soy sauce Moromi and soy sauce-like seasonings and in the range of 7 to 15% (W/V) for Miso.

The proportion of potassium chloride is 5 to 50%, preferably 10 to 30% based on total weight of potassium chloride and sodium chloride. If the proportion of potassium chloride is below 5%, the decomposition and leaching-out of useful constituents will become insufficient and the development of mellow flavor will be difficult, while if the proportion exceeds 50%, a bitter taste will be sensible.

In carrying out the process of this invention, the coexistence of potassium chloride and sodium chloride may be realized in the following various ways. In the case of soy sauce or Miso, both potassium chloride and sodium chloride are added to the initial charge (feed mixture); or potassium chloride is added to the initial charge and then sodium chloride alone or both potassium chloride and sodium chloride are added to Moromi or Miso; or sodium chloride is added to the initial charge and then potassium chloride alone or both potassium chloride and sodium chloride are added to Moromi or Miso; or both potassium chloride and sodium chloride are added to the initial charge and then potassium chloride and/or sodium chloride are again added to Moromi or Miso; or potassium chloride and sodium chloride are added to Moromi or Miso. It is preferable to add potassium chloride and sodium chloride to the initial charge or to add potassium chloride and sodium chloride to the initial charge and then add additional amounts of potassium chloride and/or sodium chloride to Moromi or Miso. The form in which potassium chloride or sodium chloride is used may be solid, aqueous solution or suspension.

The ripened Moromi, ripened Moromi-like product, or ripened Miso thus obtained is marketable as such or after subjecting to pressing, pasteurization, or further refining.

In the process of this invention, since the total concentration of potassium chloride and sodium chloride is not different from the salt concentration in a conventional process and the growth and proliferation of halotolerant lactic acid bacteria and halotolerant yeasts are not suppressed, it follows that a mellow flavor is developed and the decomposition and leachigout of useful constituents are enhanced, leading to the production of salty seasonings of high quality. Moreover, the salty seasonings produced by the present process contain much less sodium as compared with customary salty seasonings and are suitable for use in a low sodium diet for the patients suffering from cardiac diseases, vascular diseases, or nephritis.

The invention is illustrated below in detail with reference to Examples, but the invention is not limited thereto.

EXAMPLE 1

Defatted soybean (3,500 g) was soaked in 470 ml of water at 80° C. and cooked for 10 minutes in a saturated steam at 133° C. and 2 kg/cm$^2$ (gage). The cooked soybean was blended with roasted and crushed wheat, which had been obtained by roasting 3,500 g of wheat at 180° C. for 40 seconds followed by crushing. The mixture was inoculated with 0.5 g of a mold bran starter (effective number of spores: $1 \times 10^9$/g) of *Aspergillus oryzae* (ATCC 14895) on wheat bran. The inoculated mixture was incubated in a constant temperature-humidity chamber at 30° C. for 45 hours in a customary manner to prepare soy Koji. The Koji thus obtained was divided into 9 lots weighing each 800 g. Moromi charge was prepared from each lot of Koji by mixing with 1300 ml of an aqueous solution containing 22% (W/V) of salt, the composition of which being as shown in Table 1. The Moromi was fermented and ripened in a customary manner at 30° C. for 150 days. Each ripe Moromi was pressed to obtain 1600 ml of soy Moromi juice (product Nos. 1 to 6 and control Nos. 1 to 3). The analytical results for each ingredient of the soy Moromi juice, nitrogen utilization, and the results of sensory tests were as shown in Table 1.

In analysis columns of Table 1, abbreviations T.N., Glu., R.S., Alc., and L.A. stand for total nitrogen, glutamic acid, reducing sugar, alcohol, and lactic acid, respectively. The analyses for T.N., Glu., and R.S. were performed according the methods described in S. Yamada, "Jozo Bunsekiho" (Analytical Methods in Brewage; Sangyo Tosho Co.). Lactic acid was determined by means of Carboxylic Acid Analyzer (manufactured by Seishin Seiyaku Co.). The nitrogen utilization was expressed in terms of percentage ratio of dissolved nitrogen to total nitrogen content of the raw materials.

The sensory tests were performed by comparing with the Moromi juice obtained in the same manner as described above, except that a 22% (W/V) aqueous sodium chloride solution was used in place of the aqueous salt solution (Control No. 1). The results were recorded in terms of number of points scored by the sample. The scoring system: 0: no difference; 1: significant difference; 2: great difference; 3: very great difference; +: superior in flavor to the control; —: inferior in flavor to the control. Each score in Table 1 is an average number of points given by a panel of 20 competent members trained for the judgement. The meaning of signs given under the heading of "approval": *: significant difference at a level of significance of 5%; **: significant difference at a level of significance of 1%; —: no significant difference. The bitterness in Table 1 was expressed in terms of an average number of points given by a panel of 20 competent members trained for the judgement, according to the following criterions: 0: no bitterness; +1 slight bitterness; +2: bitterness; +3: great bitterness.

at 25° C., while controlling the fermentation and ripening in a customary manner, to obtain 5.5 kg of Miso from each lot (product Nos. 1 to 6 and control Nos. 1 to 3).

The results of constituent analysis and sensory tests performed on each lot of Miso were as shown in Table 2. The analyses were performed according to the procedures described in S. Yamada, "Jozo Bunsekiho" (Analytical Methods in Brewage; Sangyo Tosho Co.). The sensory tests were conducted in the same manner as in Example 1.

TABLE 2

| Sample | | Salt composition (%) | | Constituent analysis (%) | | | $\frac{\text{Water-soluble nitrogen}}{\text{Total nitrogen}} \times 100$ | Sensory test | | |
|---|---|---|---|---|---|---|---|---|---|---|
| | | KCl | NaCl | Reducing sugar | Total nitrogen | Water-soluble nitrogen | | Bitterness | Score | Approval |
| Control | 1 | 0 | 10.0 | 9.5 | 2.05 | 0.83 | 40.5 | 0 | 0 | — |
| | 2 | 2.5 | 97.5 | 9.6 | 2.07 | 0.85 | 41.1 | 0 | +0.2 | — |
| Product | 1 | 5.0 | 95.0 | 10.3 | 2.06 | 0.98 | 47.6 | 0 | +0.7 | * |
| | 2 | 10.0 | 90.0 | 10.8 | 2.06 | 1.05 | 51.0 | 0 | +1.5 | ** |
| | 3 | 20.0 | 80.0 | 10.9 | 2.05 | 1.09 | 53.2 | 0 | +1.7 | ** |
| | 4 | 30.0 | 70.0 | 11.2 | 2.05 | 1.12 | 54.6 | 0 | +1.6 | ** |
| | 5 | 40.0 | 60.0 | 11.5 | 2.06 | 1.15 | 56.1 | 0 | +0.9 | * |
| | 6 | 50.0 | 50.0 | 11.7 | 2.05 | 1.17 | 57.1 | 0 | +0.5 | * |
| Control | 3 | 60.0 | 40.0 | 11.9 | 2.05 | 1.19 | 58.0 | +1 | −0.3 | — |

As is apparent from Table 2, as compared with the control sample No. 1, when the proportion of potassium chloride was in the range of 5 to 50%, preferably 10 to

TABLE 1

| Sample | | Salt composition (%) | | Constituent analysis (%) | | | | | Nitrogen utilization (%) | Sensory test | | |
|---|---|---|---|---|---|---|---|---|---|---|---|---|
| | | KCl | NaCl | T.N. | Glu. | R.S. | Alc. | L.A. | | Bitterness | Score | Approval |
| Control | 1 | 0 | 100 | 1.70 | 1.20 | 3.50 | 2.05 | 0.65 | 82.2 | 0 | 0 | — |
| | 2 | 2.5 | 97.5 | 1.71 | 1.21 | 3.45 | 2.10 | 0.67 | 82.3 | 0 | +0.1 | — |
| Product | 1 | 5.0 | 95.0 | 1.75 | 1.29 | 3.30 | 2.30 | 0.93 | 84.3 | 0 | +0.6 | * |
| | 2 | 10.0 | 90.0 | 1.77 | 1.43 | 3.25 | 2.40 | 1.01 | 86.1 | 0 | +1.3 | ** |
| | 3 | 20.0 | 80.0 | 1.78 | 1.44 | 3.20 | 2.40 | 1.10 | 86.3 | 0 | +1.5 | ** |
| | 4 | 30.0 | 70.0 | 1.79 | 1.44 | 3.15 | 2.45 | 1.08 | 86.5 | 0 | +1.5 | ** |
| | 5 | 40.0 | 60.0 | 1.80 | 1.45 | 3.10 | 2.45 | 1.09 | 86.6 | 0 | +0.7 | * |
| | 6 | 50.0 | 50.0 | 1.81 | 1.45 | 3.10 | 2.40 | 1.12 | 86.8 | 0 | +0.5 | * |
| Control | 3 | 60.0 | 40.0 | 1.82 | 1.46 | 3.05 | 2.50 | 1.11 | 86.9 | +1 | −0.3 | — |

As is apparent from Table 1, as compared with the control sample, when the proportion of potassium chloride was in the range of 5 to 50%, preferably 10 to 30%, in the total salt content of Moromi, the Moromi juice was superior in constituent analysis, nitrogen utilization, and much superior in the results of sensory tests, particularly in bitterness.

EXAMPLE 2

In a customary manner, 800 g of rice, 10% in polishing degree, was washed, soaked, and drained. The rice was then subjected to pressure cooking for 10 minutes under the action of saturated steam at 133° C. and 2 kg/cm² (gage). The cooked rice was allowed to cool down to room temperature and inoculated with 0.5 g of a mold bran starter (effective number of spores: 1×10⁹/g) of *Aspergillus oryzae* (ATCC 11866) on wheat bran. The inoculated rice was incubated in a constant temperature-humidity chamber at 30° C. for 60 hours in a customary manner to obtain rice Koji. The rice Koji thus obtained was blended with cooked soybean treated as in Example 1 and the mixture was divided into 9 lots, each lot containing 1 kg of the rice Koji and 4 kg of the cooked soybean. Moromi charge was prepared from each lot by uniformly mixing with 0.6 kg of a mixture of potassium chloride and sodium chloride in a ratio as shown in Table 2. The charge was incubated for 90 days 30%, in the total salt content of Moromi, each lot of the products was comparable or superior in the analytical value of each constituent and much superior in the results of sensory tests, particularly in bitterness.

What is claimed is:

1. In a process for producing a soy sauce or miso wherein a raw material selected from the group consisting of a denatured protein material and a gelatinized starch material is subjected to a treatment selected from the group consisting of enzyme hydrolysis treatment, acid hydrolysis treatment, and koji treatment, followed by fermentation with halotolerant lactic acid bacteria and halotolerant yeasts, the improvement comprising conducting said fermentation in the co-presence of potassium chloride and sodium chloride, the total combined concentrations of potassium chloride and sodium chloride is 7 to 20 percent (w/v), and the amount of potassium chloride is 5 to 50 percent of the total combined weight of potassium chloride and sodium chloride.

2. A process according to claim 1, wherein the salty seasoning is soy sauce.

3. A process according to claim 1, wherein the protein material is at least one member selected from the group consisting of soybean, defatted soybean, gluten and fish meal.

4. A process according to claim 1, wherein the starch material is at least one member selected from the group consisting of wheat, barley, rice and wheat bran.

5. A process according to claim 1, 3 or 4, wherein the amount of potassium chloride is 10 to 30 percent of the total weight of potassium chloride and sodium chloride.

6. A process according to claim 1, 3 or 4 wherein the raw material comprises both protein material and starch material.

7. The process of claim 1 wherein said treatment is a koji treatment.

* * * * *